United States Patent [19]

Ahrweiler et al.

[11] 4,410,380

[45] Oct. 18, 1983

[54] METHOD FOR THE CONTINUOUS MANUFACTURE OF SHEETS OF MATERIAL ESPECIALLY WOOD CHIP BOARD

[75] Inventors: Karl-Heinz Ahrweiler, Krefeld; Eduard Küsters, Gustav-Fünders-Weg 18, D-4150 Krefeld, both of Fed. Rep. of Germany

[73] Assignee: Eduard Küsters, Krefeld, Fed. Rep. of Germany

[21] Appl. No.: 80,669

[22] Filed: Oct. 1, 1979

[30] Foreign Application Priority Data

Oct. 5, 1978 [DE] Fed. Rep. of Germany ....... 2843460

[51] Int. Cl.$^3$ .......... B29J 5/00

[52] U.S. Cl. .......... 156/62.2; 156/154; 264/109; 264/118; 264/162

[58] Field of Search .......... 156/62.2, 154, 247, 156/289, 323, 324, 583.5, 555; 264/109, 112, 113, 118, 119, 123, 139, 125, 162; 425/364 R, 373, 371

[56] References Cited

U.S. PATENT DOCUMENTS

| | | | |
|---|---|---|---|
| 3,301,726 | 1/1967 | Matsukata | 156/62.2 |
| 3,607,489 | 9/1971 | Helgesson | 156/62.2 |
| 3,762,974 | 10/1973 | Wirt | 156/62.2 |
| 3,851,685 | 12/1974 | Ahrweiler et al. | 156/583.5 |
| 3,926,542 | 12/1975 | Ahrweiler | 425/371 |

*Primary Examiner*—Michael W. Ball
*Attorney, Agent, or Firm*—Kenyon & Kenyon

[57] ABSTRACT

In a method of continuously manufacturing sheets of material such as wood chip board in which a bed of material is fed from one conveyor belt to another conveyor bed which forms part of a continuous press, in order to avoid problems caused by the discontinuity at the gaps between the two belts, a web of paper is fed onto the conveyor belt and caused to travel with the conveyor belts, the bed of material then disposed on the paper, permitting the paper to bridge the gap between the conveyor belts without disturbance of the bed of material. The paper, which is then pressed and intimately bonded to the bed of material when making the sheet of material, is subsequently ground off.

5 Claims, 2 Drawing Figures

METHOD FOR THE CONTINUOUS MANUFACTURE OF SHEETS OF MATERIAL ESPECIALLY WOOD CHIP BOARD

BACKGROUND OF THE INVENTION

This invention relates to the continuous manufacture of sheets of material, particularly wood chip board in general and more particularly to an improved manner of conveying the material used in the manufacture to a press.

A method for the continuous manufacture of sheets of material, especially of wood chip board in which a bed of self-bonding particles provided with a binder is applied to a first endless, revolving, substantially horizontal belt and is transferred from this belt to a second endless, revolving, substantially horizontal belt following the first belt, the second belt together with an endless belt disposed parallel and on top thereof and revolving in the same direction forming a press section in which the bed of particles is compressed between the belts and solidified under the action of pressure, and optionally heat to form a sheet of material, is described in U.S. patent application Ser. No. 55,510.

Another machine for the manufacture of chip board, fiber board and the like, in which the bed of chips is transferred from one conveyor belt to an endless revolving belt following the former, is known from DE-AS No. 22 31 802. This machine, however, does not comprise a continuously operating pressing section in which the material is compressed between endless, revolving belts, but a platen press which operates intermittently. The cake of fiber material provided with glue, from which the chip board is made, is fed to the platen press by means of a belt arrangement. For transferring the material from the belt arrangement into the platen press, an auxiliary device is provided which consists of a knife-like deflection strip, around which the conveyor belt is deflected with a very small radius, and in which the transfer point can be brought very close to the following belt or the belt trays of the platen press. Such small radii are possible, of course, only with correspondingly flexible belts, for instance, such of textile materials, but not with sheet metal belts.

However, in a chip board press of the type disclosed in U.S. Pat. No. 3,851,685 which utilizes sheet metal belts and which is the type of press with which the present invention is concerned, such small radii cannot be used.

In this press, the web is conducted between endless belts which are arranged on top of each other, co-rotate in the direction corresponding to the travel direction of the web and extend over the width of the web. Roller chains are provided which roll between the belts and a smooth support structures provided above and below the web. These roller chains revolve in endless succession in the longitudinal plane perpendicular to the web, are narrow relative to the width of the web, have constant width in the travel direction, form many individual legs closely adjacent transversely to the web and transmit the working pressure and, possibly, the heat from the support structure to the belts while rolling. The press section proper corresponds to the length of the support structure. However, the lower belt is longer and extends out of the press section up to the strewing device, in which the glue-covered chips are strewn onto the top side of the lower forming belt in a bed which results in the chip board. The lower belt thus takes along the bed of which the board is made and introduces it into the press section proper. In the region ahead of the press section, the lower belt therefore has the function of a conveyer belt, while the formation of the web proper takes place only in the press section.

The belts are steel belts about 1.2 mm thick. In the region, in which the chip material is transported on the lower belt before it enters the press section, the temperature of the lower forming belt must be low and in any case remain below 50° C. so as to prevent premature condensation of the resin on the chips, which would result in reduced strength of the chip board. The web thus enters the press section in relatively cold condition and is heated up only in the press; the heat is transferred into the web through the roller chains bracing the belt against the support structure, and through the belt itself.

Because the belt is heated up when passing through the press section, the belt expands in the lengthwise direction in accordance with its temperature rise. The rollers of the roller chains rolling on the belt are taken along in the process. However, they are held on the other hand by the contact with the support structure on the side opposite the belt and further by the pins provided at the straps of the roller chains, so that the rollers of the roller chains cannot follow the expansion of the belts when passing through the press section.

This results in a longitudinal stress in the strap chains of the roller chains and in a tendency of the rollers of the roller chains to slip through in the lengthwise direction relative to the belt and/or the support structure.

Accordingly, one strives to avoid a temperature change of the belt arrangement when it passes through the press section, to the extent possible. Since it is impossible to make the temperature uniform over the entire length of the belt, because it must not exceed a given value in the forward section (which, in some cases, may even require cooling the belt after it leaves the press section), the approach remains to separate the belt arrangement and to use a forward traveling belt which has only a transport function and extends up to the entrance of the press section, and to leave the belts in the press section entirely in the press so that they have a uniform, high temperature, without thereby influencing the temperature of the conveyor belt in the forward-travel section.

The real problem, however, is now the transition from the first belt to the belt in the press section. The bed is carefully built up from different layers of chips with different fineness and different glue application, where the finest, i.e. practically meal-fine chips are found in the outer layers and drop through any gap in the belt arrangement. If the transition is not perfect, the composition of the bed also gets mixed up.

The design according to DE-AS No. 22 31 802, where the belts are conducted around a sharp corner, is out of the question in a press according to U.S. Pat. No. 3,851,685 since the sheet metal belts used require a certain minimum radius for the deflection.

Thus, it is the object of the present invention, starting with a press of the type disclosed in U.S. Pat. No. 3,851,685, to provide a method which permits a transition from a first belt to the belt in the press section in such a manner that there is as little disturbance as possible of the material transported on the belts.

SUMMARY OF THE INVENTION

In accordance with the present invention, this object is attained in a device of this type by arranging a co-traveling paper web, at least as wide as the bed, and causing this paper web to travel with both the first conveyor belt and press conveyer belt thereby bridging the gap between the two belts and supporting the particles of the web; pressing the paper with the bed; and thereafter, grinding off the paper in a subsequent grinding operation which is required in any case.

The paper traveling along serves as the carrier for the bed and conducts the same over interruptions of the support without causing appreciable disturbances in the layer structure of the bed. In the press section, the paper web is pressed to the board, forming a homogeneous unit. Thus, it does not constitute a so-called back-cloth which could be removed from the sheet web after leaving the press section. The paper web is, rather, intimately bounded to the substance of the sheet. In the subsequent grinding operation the paper is ground off. It is true that wood chip sheets made on a machine according to U.S. Pat. No. 3,851,685 require no subsequent grinding for tolerance reasons. For reasons of providing a particularly smooth surface, however, a slight grinding operation is incorporated here also. With the present invention, no additional grinding operation is therefore required, but the total or partial removal of the paper layer is performed during the grinding operation which takes place anyhow.

To make the structure of the sheet uniform on both sides, it may be advantageous to let a further paper web run onto the bed before it reaches the press section, which is then bonded to the top side of the sheet.

In accordance with a further feature of the present invention, the paper webs on both sides protrude beyond the width of the bed at the longitudinal edges of the bed.

This further aspect of the present invention is related to the fact that, in band presses operating with roller chains, it is essential that the particles of the bed be prevented from getting into the path of the roller chains. In known band presses of the type under discussion U.S. Pat. No. 3,926,542 provision is therefore made that the belts protrude sufficiently far at the edge of the bed. This, however, generates new problems, because the overhanging edges of the belt are cooled off relative to the regions of the belts located in the interior of the press and the different stresses produce deformations of the belts, which must be countered at considerable cost, for instance by heating the edges separately as in U.S. Pat. No. 3,926,542.

By letting the paper protrude beyond the edge of the bed, it is no longer necessary to let the belts themselves protrude so far, since the job of protection against the material of the bed is taken over by the paper. In this manner, the stress problems resulting from the overhang of the edges of the belts can be reduced substantially.

Only the cheapest possible quality of paper is of interest, of course, for instance an untreated thin paper such as newsprint.

DETAILED DESCRIPTION OF THE INVENTION

Figure 1:
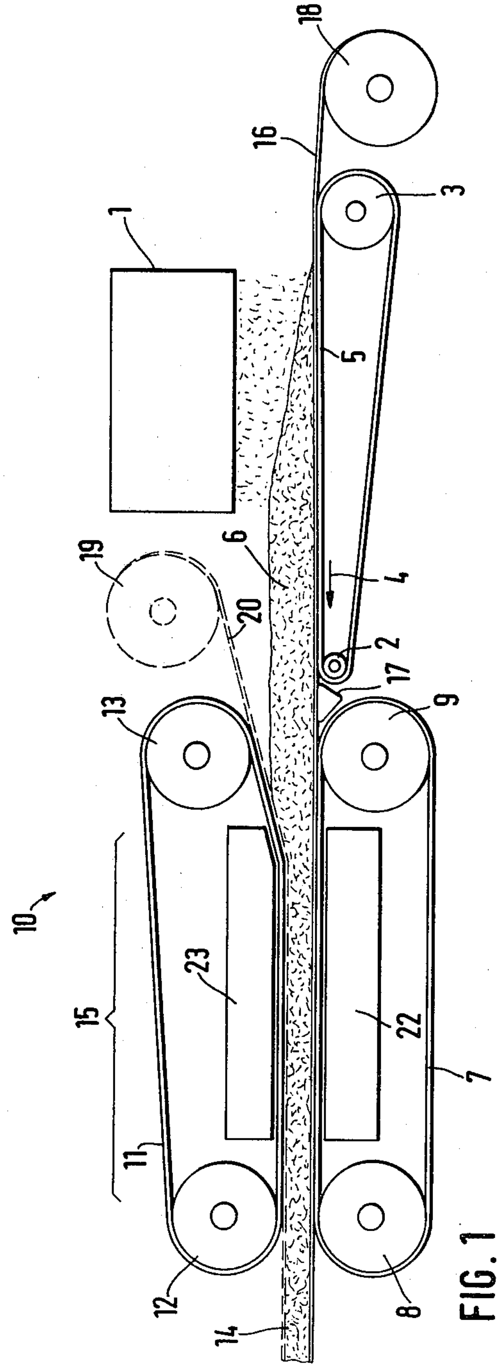
FIG. 1 shows a partial longitudinal section through a machine for the manufacture of wood chip board.

The machine, designated as a whole with 10, comprises a strewing device 1 which applies a bed 6 of glue-treated wood chips with a defined structure to a conveyer belt 5, the upper section of which advances substantially horizontally in the direction of the arrow 4 over the deflection rolls 2 and 3. The finest chips or wood particles lie on top and at the bottom because they later make up the surface of the wood chip board, while coarser particles are piled-on in the center.

The bed 6 runs into a band press which comprises a lower belt 7 of sheet steel, approximately 1 to 1.5 mm thick, which revolves over the cylinders 8 and 9. Above the belt 7, a similar belt 11 is provided, which revolves around cylinders 12 and 13. The bed is compressed between the belts 7 and 11 and hardened under the action of pressure and, as the case may be, heat to form a sheet web 14. In the press section proper 15, the belts are braced via co-rotating roller chains against suitable support structures 22 and 23.

Before the bed 6 is applied, a web of paper 16, which is at least as wide as the bed, runs from the roll 18 onto the conveyer belt 5. The bed 6 is therefore transported on the paper web 16 in the direction of the arrow 4. The conveyer belt 5 extends nearly up to the belt 7. Between the adjacent deflection rolls, a slide element 17 is provided which bridges the unavoidable gap. The bed is transferred on the paper web 16 from the conveyor belt 5 to the belt 7 via the slide element 17 without disturbance. In the press section 15, the paper web 16 is intimately bonded to the bed 6.

Figure 2:
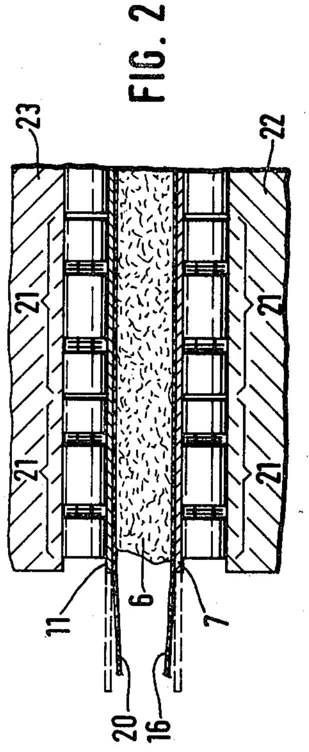
FIG. 2 shows a partial cross section through the edge portion of the press section in FIG. 1.

Also to the top side of the bed 6, a paper web 20 which is likewise bonded to the bed 6 in the press section 15, can be applied from a roll 19. This is done, however, under a different aspect than the conduction over the slide element 17. For, the paper webs 16 and 20 are made wider than the bed 6, so that they protrude laterally beyond the edge of the bed 6 in the press section 15, as is evident from FIG. 2. FIG. 2 represents a partial cross section of the press section 15, in which the belts 7 and 11 roll via roller chains 21 on the support structures 22 and 23 arranged inside the belts 7 and 11. The roller chains 21 each have three rollers which are arranged side by side and between which strap chains extend. They abut each other directly and transmit the pressure and, if applicable, the heat from the support structures 22, 23 to the belts 7 and 11 and the bed 6. The paper webs 16 and 20 overhanging with their edges beyond the edge of the belts 7 and 11 according to FIG. 2 prevent particles from the bed 6 from getting into the travel path of the rollers 21. Without the paper webs 16 and 20, the belts 7 and 11 would have to be wider, as is indicated by the broken lines. These overhanging edge portions of the belts 7 and 11, however, bring about problems of different thermal stresses due to the temperature difference. These are avoided by the overhanging edges of the paper webs 16, 20 which make it possible to let the belts 7 and 11 protrude only little from the vicinity of the rollers in the manner shown in FIG. 2.

What is claimed is:

1. In a method for the continuous manufacture of sheets of material such as wood chip board which includes the steps of applying a bed of particles which are self-bonding or which have been provided with a binder to a first endless, revolving, substantially horizontal conveyor belt; transferring said bed of material from said first belt to a second endless revolving substantially horizontal belt following said first belt, said second belt cooperating with a third endless belt disposed parallel and on top thereof, said two belts revolving in the same direction, to form a press section; compressing said bed between said belts in said press section and solidifying said bed under the action of the pressure and, optionally, heat to form a sheet web, the improvement comprising feeding a paper web onto said first conveyor belt so that said paper web travels with said first and said second conveyor belts, said paper web being at least as wide as said bed; applying said bed to said paper web; pressing said paper web with said bed to form said sheet web; and subsequently grinding said paper off of said sheet web.

2. The method according to claim 1 and further including feeding a further paper web onto the top of said bed before it reaches said press section and pressing said further paper web with said bed of material to form said sheet web; and subsequently grinding off said further paper web.

3. The method according to claim 2 wherein said paper web and further paper web protrude beyond the width of the bed at the longitudinal edges by a preselected amount.

4. The method according to one of claims 1–3 wherein said paper web comprises an untreated thin paper.

5. The method according to claim 4 wherein said paper comprises newsprint.

* * * * *